United States Patent
Attendu et al.

(10) Patent No.: US 12,277,391 B2
(45) Date of Patent: Apr. 15, 2025

(54) CROSS-ATTENTION BETWEEN SPARSE EXTERNAL FEATURES AND CONTEXTUAL WORD EMBEDDINGS TO IMPROVE TEXT CLASSIFICATION

(71) Applicant: NUANCE COMMUNICATIONS, INC., Burlington, MA (US)

(72) Inventors: Jean-Michel Attendu, Montréal (CA); Alexandre Jules Dos Santos, Montréal (CA); François Duplessis Beaulieu, Montréal (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 253 days.

(21) Appl. No.: 17/837,475

(22) Filed: Jun. 10, 2022

(65) Prior Publication Data
US 2023/0401383 A1  Dec. 14, 2023

(51) Int. Cl.
*G06F 40/279* (2020.01)
*G06F 40/284* (2020.01)
*G06F 40/30* (2020.01)
*G06N 3/04* (2023.01)

(52) U.S. Cl.
CPC .................. *G06F 40/284* (2020.01)

(58) Field of Classification Search
CPC ...... G06F 40/169; G06F 40/279; G06F 40/30; G06N 3/02; G06N 3/04; G06N 3/045; G06V 10/70; G06V 10/80; G06V 10/82
USPC .............. 704/1, 9, 232; 706/12, 20; 382/155
See application file for complete search history.

(56) References Cited

U.S. PATENT DOCUMENTS

| | | | | |
|---|---|---|---|---|
| 9,436,760 B1 * | 9/2016 | Tacchi | ............... | G06F 40/30 |
| 11,526,698 B2 * | 12/2022 | Lee | ............... | G06N 3/044 |
| 2023/0077830 A1 * | 3/2023 | Quan | ............... | G06N 20/00 382/155 |
| 2023/0077849 A1 * | 3/2023 | Xu | ............... | G06F 40/295 382/190 |
| 2023/0109407 A1 * | 4/2023 | Hu | ............... | G10L 15/16 704/232 |
| 2023/0154221 A1 * | 5/2023 | Gu | ............... | G06F 40/30 382/156 |
| 2023/0244907 A1 * | 8/2023 | Hawthorne | ............... | G06N 3/084 706/15 |

(Continued)

OTHER PUBLICATIONS

Magnolini, Simone et al.; "How to Use Gazetteers for Entity Recognition with Neural Models"; In Proceedings of the 5th Workshop on Semantic Deep Learning (SemDeep-5), pp. 40-49, 2019.

(Continued)

*Primary Examiner* — Martin Lerner
(74) *Attorney, Agent, or Firm* — Barta Jones, PLLC

(57) ABSTRACT

There is provided a method that includes obtaining (a) a dense representation of external features, (b) a dense representation of text, and (c) a mask that associates the external features to tokens of the text, and employing a cross-attention process that utilizes the mask to perform an information fusion of the dense representation of the external features and the tokens of the text, thus yielding a joint representation of the external features and the tokens of the text. There is also provided a system that executes the method, and a storage device that includes instructions for controlling a processor to perform the method.

20 Claims, 5 Drawing Sheets

(56) References Cited

U.S. PATENT DOCUMENTS

| | | | |
|---|---|---|---|
| 2023/0298609 A1* | 9/2023 | O'Malley | G10L 15/16 704/226 |
| 2023/0367975 A1* | 11/2023 | Zhang | G06N 3/0442 |
| 2023/0394251 A1* | 12/2023 | Zenkel | G06F 40/284 |

OTHER PUBLICATIONS

Peshterliev, Stanislav et al.; "Self-Attention Gazetteer Embeddings for Named-Entity Recognition"; 2004.04060v2; Apr. 2020, 6 pages.

* cited by examiner

CROSS-ATTENTION BETWEEN SPARSE EXTERNAL FEATURES AND CONTEXTUAL WORD EMBEDDINGS TO IMPROVE TEXT CLASSIFICATION

BACKGROUND OF THE DISCLOSURE

1. Field of the Disclosure

The present disclosure relates to natural language processing, and more particularly, to a technique of providing a representation of information that depends on its context.

2. Description of the Related Art

The approaches described in this section are approaches that could be pursued, but not necessarily approaches that have been previously conceived or pursued. Therefore, the approaches described in this section may not be prior art to the claims in this application and are not admitted to be prior art by inclusion in this section.

A token is a sequence of characters grouped together as a useful semantic unit for processing. For example, in English, a token can be a word or sub-word unit. In Japanese, a single kanji could be a token. In modern natural language understanding (NLU) systems, transformer encoder models are used to represent token information contextually for text classification. These models are pretrained on a large corpus of unlabeled text, and are subsequently finetuned on a specific NLU task. During finetuning, it may be desired to leverage project-specific external feature information generated from gazetteers/lists or from rule-based heuristics.

Prior art methods for external feature fusion with a deep neural network (DNN) often rely on concatenating a dense representation of the external features to the contextual embedding, before passing the full representation to the next layer of the DNN.

Consideration of external features by the model can be beneficial for many NLU applications, such as named entity recognition. For example, in a restaurant reservation NLU application, the external features could be generated from a list of all restaurants in a town. While training, the model learns to associate the presence of the external feature with the restaurant entity. Only a proportion of restaurant names are in the examples used to train the model. In deployment, the model will recognize the external feature for restaurant entities that were not included in training examples, which facilitates the correct identification of corresponding text as the restaurant entity. Although such external features are used in current art, it is unclear how to optimally leverage external features in conjunction with token features in deep neural net-based systems typically used in modern NLU.

SUMMARY OF THE DISCLOSURE

There is provided a method that includes obtaining (a) a dense representation of external features, (b) a dense representation of text, and (c) a mask that associates the external features to tokens of the text, and employing a cross-attention process that utilizes the mask to perform an information fusion of the dense representation of the external features and the tokens of the text, thus yielding a joint representation of the external features and the tokens of the text. There is also provided a system that executes the method, and a storage device that includes instructions for controlling a processor to perform the method.

BRIEF DESCRIPTION OF THE DRAWINGS

A component or a feature that is common to more than one drawing is indicated with the same reference number in each of the drawings.

DESCRIPTION OF THE DISCLOSURE

The present document discloses a method that injects external feature information in an encoder model using cross-attention to improve classification accuracy. The method improves inductive bias by specifically calculating an attention score that gives relative importance to each external feature with respect to token information. This results in improved accuracy.

In machine learning, an embedding is a representation of an input in a more convenient latent space. In natural language processing, word embedding is a representation of words for text analysis, typically in the form of a real-valued vector that encodes the meaning of the word such that the words that are closer in a vector space are expected to be similar in meaning.

Contextual representation of token information or external feature information signifies that weights of the embedding that are trained in the model to represent the token or the external feature also take into consideration the surrounding tokens or external features, thus providing a representation of the information that depends on its context.

Figure 1:
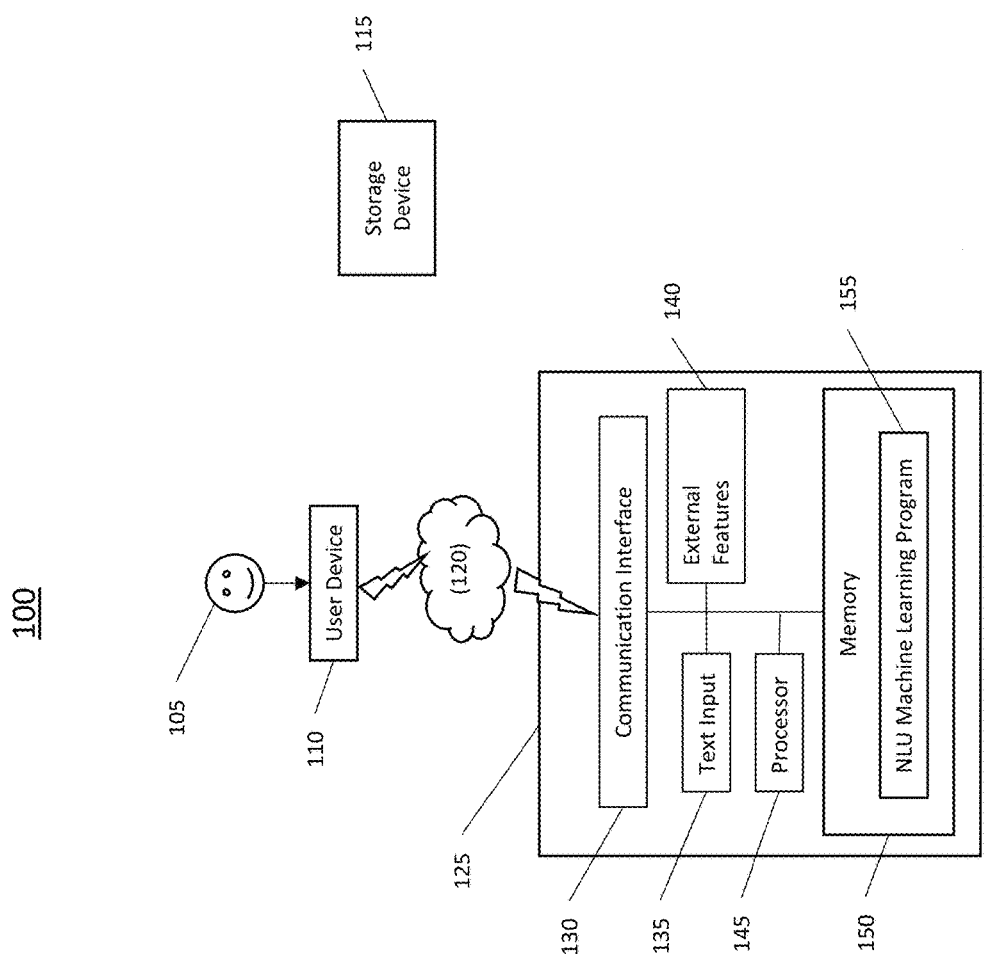
FIG. 1 is a block diagram of an environment for operation of a natural language understanding (NLU) system.

FIG. 1 is a block diagram of an environment 100 for operation of a natural language understanding (NLU) system 125. In environment 100, a user 105 interacts with NLU system 125 via a user device 110. User device 110 and NLU system 125 are communicatively coupled to a network 120.

Network 120 is a data communications network. Network 120 may be a private network or a public network, and may include any or all of (a) a personal area network, e.g., covering a room, (b) a local area network, e.g., covering a building, (c) a campus area network, e.g., covering a campus, (d) a metropolitan area network, e.g., covering a city, (e) a wide area network, e.g., covering an area that links across metropolitan, regional, or national boundaries, (f) the Internet, or (g) a telephone network. Communications are conducted via network 120 by way of electronic signals and optical signals that propagate through a wire or optical fiber, or are transmitted and received wirelessly.

User device 110 is a device such as a cell phone or a computer, which includes an input device such as a keyboard and/or a microphone, and an output device such a display and/or speaker.

NLU system 125 includes a communication interface 130, a processor 145 and a memory 150.

Communication interface 130 is a component through which NLU system 125 communicates with user device 110 via network 120. Communication interface 130 may be implemented, for example, in an electronic circuit.

Processor 145 is an electronic device configured of logic circuitry that responds to and executes instructions.

Memory 150 is a tangible, non-transitory, computer-readable storage device encoded with a computer program. In this regard, memory 150 stores data and instructions, i.e., program code, that are readable and executable by processor 145 for controlling operations of processor 145. Memory 150 may be implemented in a random access memory (RAM), a hard drive, a read only memory (ROM), or a combination thereof. One of the components of memory 150 is a program module, namely NLU machine learning program 155.

The term "module" is used herein to denote a functional operation that may be embodied either as a stand-alone component or as an integrated configuration of a plurality of subordinate components. Thus, NLU machine learning program 155 may be implemented as a single module or as a plurality of modules that operate in cooperation with one another. Moreover, although NLU machine learning program 155 is described herein as being installed in memory 150, and therefore being implemented in software, it could be implemented in any of hardware (e.g., electronic circuitry), firmware, software, or a combination thereof.

NLU machine learning program 155 contains instructions for controlling processor 145 to execute processes, i.e., methods, described herein. In the present document, although we describe operations being performed by NLU machine learning program 155 or its subordinate processes, the operations are actually being performed by processor 145.

NLU machine learning program 155, and more specifically processor 145 operating pursuant to instructions in NLU machine learning program 155, annotates text data with pre-defined categories of labels. The categories of labels represent different concepts to which NLU system 125 associates input text. For a given NLU application, the categories could represent different tasks for NLU system 125 to recognize (e.g., "Start timer", "Send text message", "Play music", etc.) or entities (e.g., "duration of the timer", "text message to send", "song to play", etc.). The annotations are typically at a sentence level or at a token level. In this regard, NLU machine learning program 155 processes text input 135 and external features 140.

Text input 135 is text that is to be automatically annotated by NLU machine learning program 155.

External features 140 is a sequence of tokens that are grouped under similar characteristics or concepts. A token consists in a sequence of characters grouped together as a useful semantic unit for processing. For example, in English, a token can be a word or sub-word unit. In Japanese, a single kanji could be a token. A sequence of tokens can be obtained, for example, from a pre-defined list of terms, or from a program, e.g., regular expression or other heuristics.

While NLU machine learning program 155 is indicated as being already loaded into memory 150, it may be configured on a storage device 115 for subsequent loading into memory 150. Storage device 115 is a tangible, non-transitory, computer-readable storage device that stores NLU machine learning program 155 thereon. Examples of storage device 115 include (a) a read only memory, (b) an optical storage medium, (c) a hard drive, (d) a memory unit consisting of multiple parallel hard drives, (e) a universal serial bus (USB) flash drive, (f) a random access memory, and (g) an electronic storage device coupled to NLU system 125 via network 120.

Although NLU system 125 is represented herein as a standalone device, it is not limited to such, but instead can be coupled to other devices (not shown) in a distributed processing system.

Figure 2:
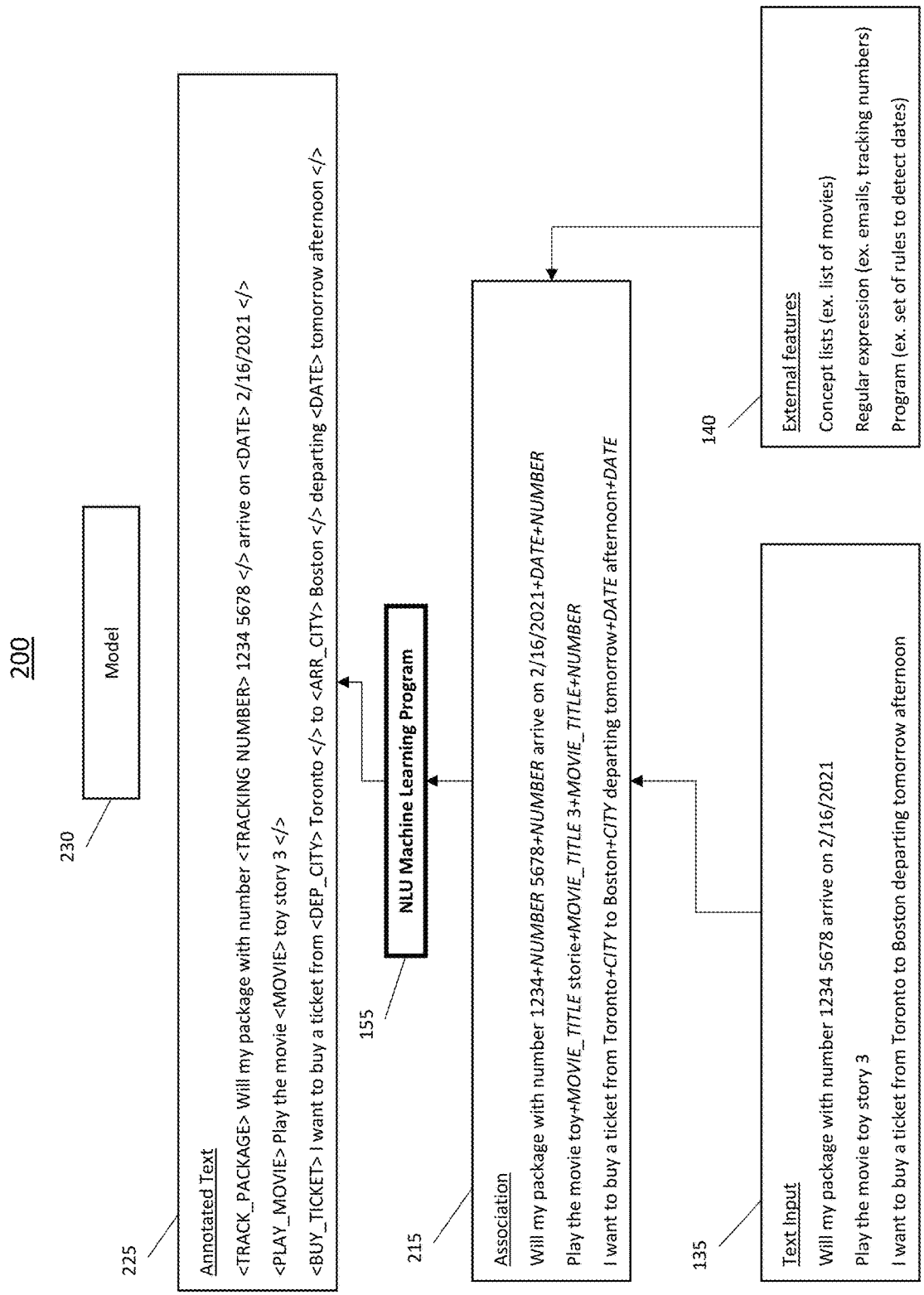
FIG. 2 is a block diagram of a process performed in accordance with a NLU machine learning program.

FIG. 2 is a block diagram of a process 200 performed by NLU machine learning program 155, utilizing example values for each of text input 135 and external features 140. As mentioned above, although we describe operations being performed by NLU machine learning program 155 or its subordinate processes, the operations are actually being performed by processor 145.

Association 215 is a result of text input 135 and external features 140 being associated with one another. For example, if the external feature is defined by a list of concepts, any sequence of text in text input 135 that is also on the list of concepts would be associated with a corresponding external feature. This association is performed in a pre-processing phase, prior to injecting text input 135 and external features 140 into NLU machine learning program 155. In NLU machine learning program 155, the association between the external features 140 and the text is represented by an external features mask 431 (see FIG. 4).

NLU machine learning program 155 receives association 215, and produces annotated text 225. Annotated text 225 is an example of an utterance with annotated intent and concept. Ground truth is information that is known to be real or true, provided by direct observation and measurement from human annotator, i.e., empirical evidence, as opposed to information statistically inferred by the machine learning model. In training examples, ground truth annotations associate text with different categories of concepts. From these ground truth examples, NLU machine learning program 155 trains a machine learning model, namely model 230. Model 230 is used to predict annotations from unannotated text.

During training, NLU machine learning program 155 compares its predicted annotations with the ground truth using the provided training examples. NLU machine learning program 155 iteratively optimizes numerical values of its parameters (or weights) to provide predictions that are in accordance with the ground truth annotations. Typically, a pre-processing step is required to provide a numerical representation of the annotations to NLU machine learning program 155 in order to correctly process the information.

Figure 3:
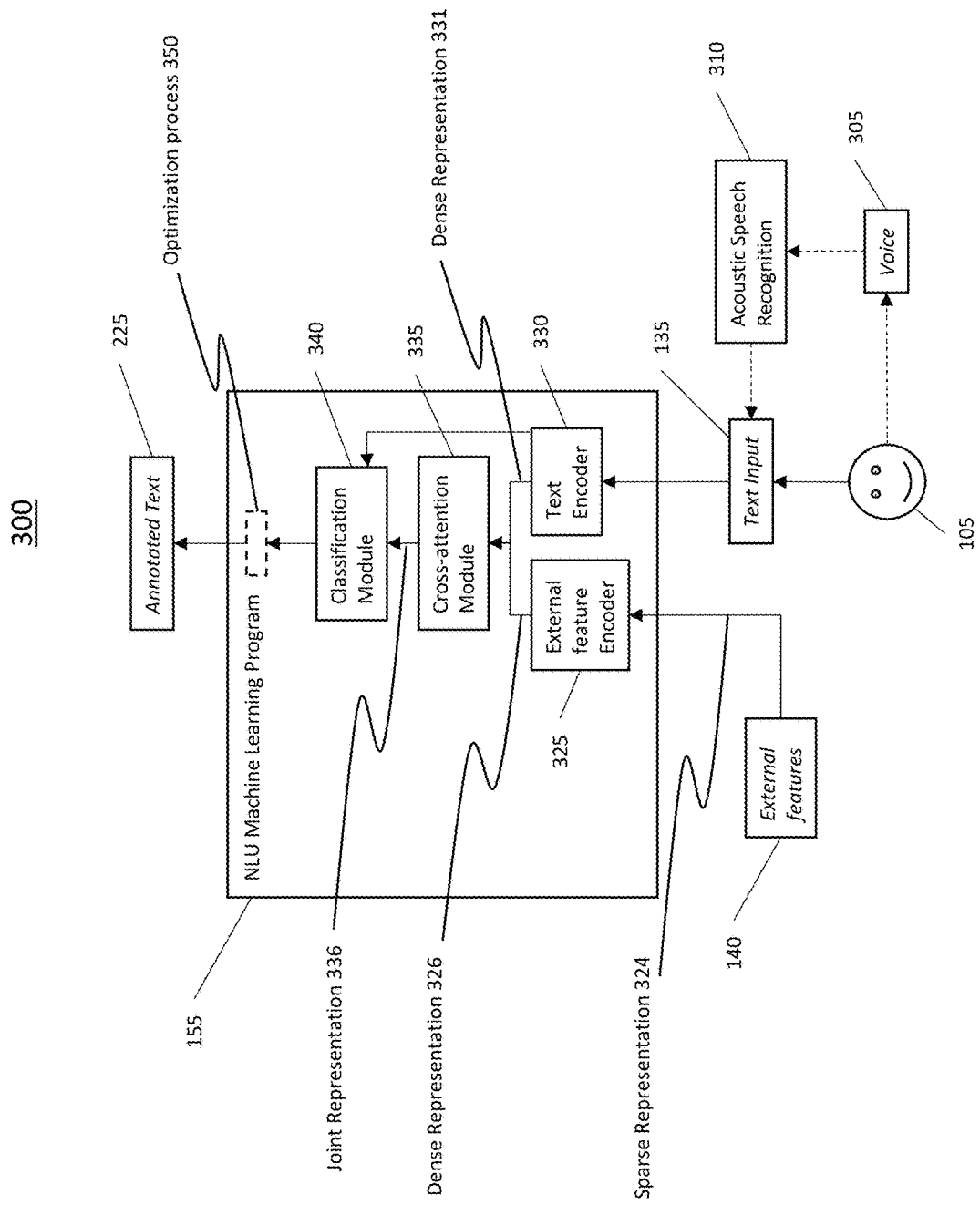
FIG. 3 is a block diagram of a process performed in accordance with a NLU machine learning program.

FIG. 3 is a block diagram of a process 300 performed by NLU machine learning program 155, showing some additional details of NLU machine learning program 155.

User 105, through user device 110 (not shown in FIG. 3), provides text input 135 either (a) directly as text, or (b) by way of voice 305, i.e., an acoustic voice signal, which is processed by acoustic speech recognition 310, which translates voice 305 into text input 135. Acoustic speech recognition 310 is a separate machine learning program trained specifically for this task.

NLU machine learning program 155 includes an external feature encoder 325, a text encoder 330, a cross-attention module 335, and a classification module 340.

A dense representation is a representation of information in the form of an array of N positive and/or negative floating-point values.

External feature encoder 325 encodes external features 140 from a sparse representation 324 into a dense representation 326. Dense representation 326 is an array of floating-point values.

NLU machine learning program 155 chooses the values of dense representations to encode information in a way that optimizes its objective, namely, in the present case, text classification. A sparse representation is an array of ones and zeros, representing a presence or an absence of input features. Encoding a sparse representation into a dense representation can be performed with, for example, matrix multiplication between sparse and dense arrays.

Text encoder 330 encodes text input 135 into a dense representation 331, for example, with a BERT encoder.

Attention operation compares two series of inputs and calculates scores between each element of the two series. The first series is then modified according to a combination of those scores and a representation of the second series.

Cross-attention is the attention operation applied to two different series of inputs.

A cross-attention layer is a sub-part of a neural net which implements the cross-attention operation.

Self-attention is the attention operation applied to a series of inputs and itself.

A self-attention layer is a sub-part of a neural net which implements the self-attention operation.

Fusion is an operation of combining representations from two modalities, e.g., external features and text, into a single representation. The simplest fusion method would be to add the dense representations of the external features and the text, i.e., add the two arrays together. Here, we propose a more complex approach, to perform fusion via the cross-attention layer.

A joint representation is a representation obtained from fusing a text representation with an external feature representation. In an exemplary embodiment, the joint representation is a dense array produced from the fusion of the representation of two modalities. Fused information means that the joint representation relies on information from both modalities, and thus, the joint representation leverages information from both modalities.

Cross-attention module 335 receives dense representation 326 from external feature encoder 325, and dense representation 331 from text encoder 330, and performs information fusion between dense representation 326 and dense representation 331 using a cross-attention layer, thus yielding a joint representation 336.

Classification module 340 performs a classification operation from joint representation 336, i.e., the joint representation of the token information and external feature information, and produces annotated text 225.

The classification operation in classification module 340 is an operation of assigning a label to unannotated text. For example, we can multiply the joint representation (a dense 1×N vector) with a classification matrix (N×M dense matrix), and apply a sigmoid or softmax function on the output to obtain M values between 0 and 1. These values represent probabilities that the text and external features characterized by the joint representation are associated with any of the M classes/categories.

An optimization process 350 is a technique, such as gradient descent, used to optimize the values of all parameters in the model in order for the model to provide the correct classification labels with respect to ground truth examples. Optimization process 350 is only applied during a training phase using the provided ground truth labels, and is therefore represented in the accompanying figures as a box having a dashed line perimeter. Beyond the training phase, the values of the parameters are fixed.

Figure 4:
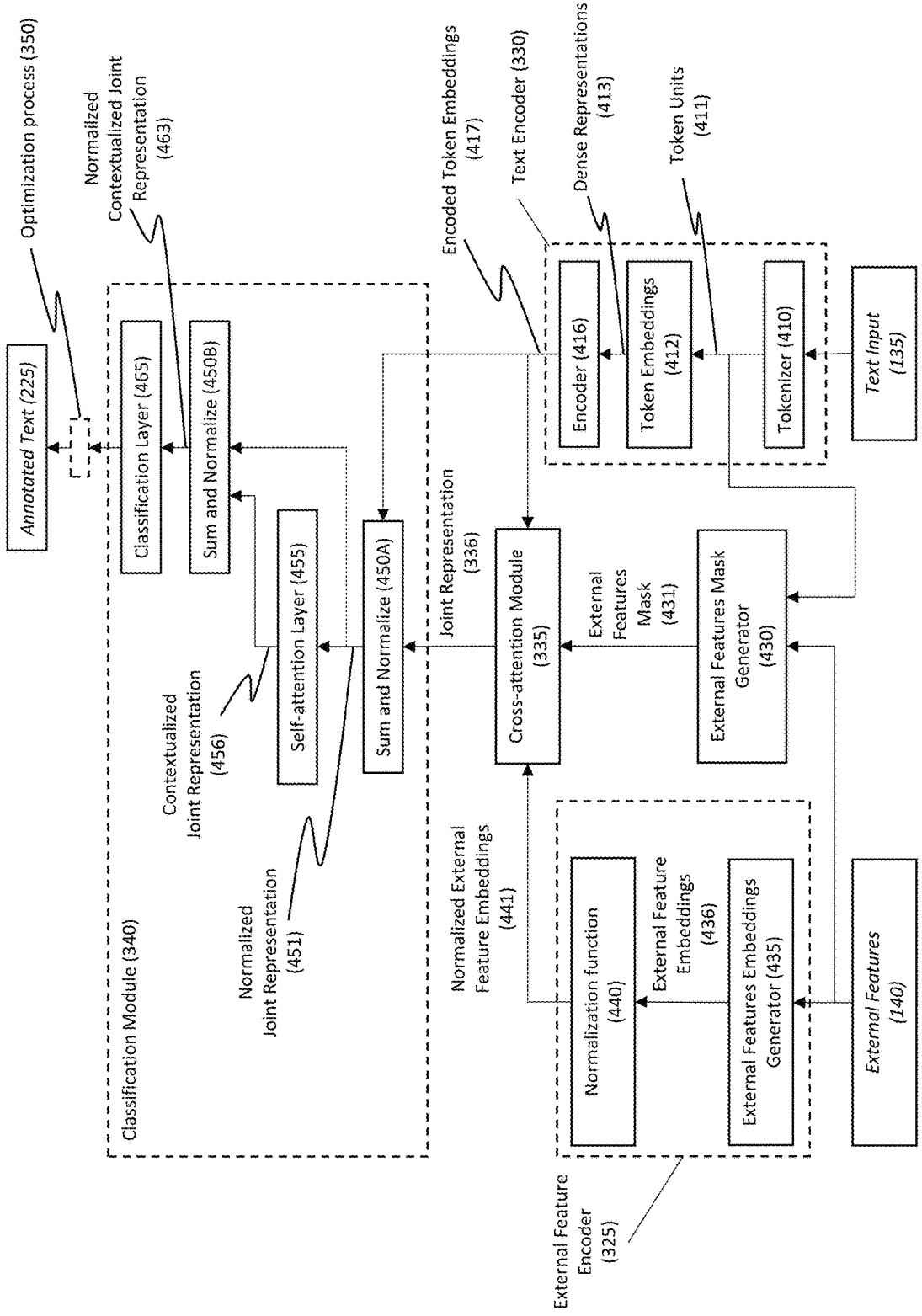
FIG. 4 is a block diagram of a process performed in accordance with a NLU machine learning program.

FIG. 4 is a block diagram of a process 400 performed by NLU machine learning program 155. Process 400, similarly to process 300, includes external feature encoder 325, text encoder 330, cross-attention module 335, and classification module 340. Process 400 additionally includes an external features mask generator 430.

FIG. 4 also shows some additional details of external feature encoder 325, text encoder 330, and classification module 340.

External feature encoder 325 includes an external features embeddings generator 435, and a normalization function 440.

Text encoder 330 includes a tokenizer 410, token embeddings 412, and an encoder 416.

Classification module 340 includes a sum and normalize operation 450A, a self-attention layer 455, a sum and normalize operation 450B, and a classification layer 465.

External features 140 are routed to external features embeddings generator 435 and external features mask generator 430.

Text input 135 is routed to tokenizer 410, which produces tokenized units 411, which are then routed to external features mask generator 430.

External features embeddings generator 435 receives external features 140, and transforms external features 140 into a dense representation, i.e., external feature embeddings 436. External feature embeddings 436 are dense embeddings for which weights are optimized while training model 230. Each external feature type is associated to a unique embedding. External feature embeddings 436 are routed to normalization function 440.

Normalization function 440 receives external feature embeddings 436, and performs a normalizing operation such as a "layer norm", thus yielding normalized external feature embeddings 441. Normalization is an operation that make every dense representation have the same scale to facilitate optimization process 350. Layer norm is a standard operation in modern machine learning. Normalized external feature embeddings 441 are routed to cross-attention module 335.

Tokenizer 410 receives text input 135, and divides text into token units 411. For example, text input "this is an example" could be tokenized as [this, is, an, example] or as [this, is, an, ex, ample], depending on the tokenizer being used.

Token embeddings 412 receives the (sub)word token units 411 from tokenizer 410, and transforms sparse tokens into dense representations 413. Consider three possible tokens [a,b,c] in a vocabulary. The input text "acba" would be tokenized as [a,c,b,a]. We can express this text input in the following sparse representation [1,0,0], [0,0,1], [0,1,0], [1,0,0], where first position corresponds to "a", second to "b" and third to "c". We can multiply the sparse vector with a 3×M dense matrix to obtain a 1×M dense vector representation for the token.

Encoder 416 receives dense representations 413 from token embeddings 412, and produces an improved dense representation, namely encoded token embeddings 417. For example, if encoder 416 is a BERT encoder, it contextualizes the representation and improves token representation based on its pre-training. NLU machine learning program 155 is independent of using a pre-trained encoder or not, but current NLP is based on BERT and in the future may utilize any text encoder. Encoded token embeddings 417 from encoder 416 are routed to cross-attention module 335 and sum and normalize operation 450A.

External features mask generator 430 receives external features 140 and token units 411, and generates an external features mask 431. For a given utterance, external features mask 431 is a sparse matrix that represents which external feature is associated to which token. For each token, only external features associated with the token will contribute to joint representation 336, other external features will have their contribution forced to zero in accordance with external features mask 431. For example, if text input 135 has N tokens, and we consider M categories of external features, external features mask 431 would be an N×M matrix with ones when a given token is associated to a given external feature, and zeros otherwise. External features mask 431 is routed to cross-attention module 335, which uses external features mask 431 to select which external feature will contribute to joint representation 336.

Cross-attention module 335 receives (a) normalized external feature embeddings 441 from normalization function 440, (b) the sparse matrix, i.e., external features mask 431, from external features mask generator 430, and (c) encoded token embeddings 417 from encoder 416, and performs information fusion. The output of cross-attention module 335, i.e., joint representation 336, is routed to sum and normalize operation 450A. Further details of cross-attention module 335 are described below, with reference to FIG. 5.

Sum and normalize operation 450A receives (a) joint representation 336 from cross-attention module 335, and (b) encoded token embeddings 417 from encoder 416, sums joint representation 336 and encoded token embeddings 417, and performs a normalization operation such as "layer norm". The output of sum and normalize operation 450A is a normalized joint representation 451, which is routed to self-attention layer 455 and sum and normalize operation 450B.

Self-attention layer 455 receives normalized joint representation 451 from sum and normalize operation 450A, and performs an attention mechanism operation between a dense embedding and itself, thus yielding a contextualized joint representation 456.

An attention mechanism is a widely used method in modern machine learning that takes as input, two dense representations, and learns (e.g., by utilization of optimization process 350 during training) how to modify the first dense representation in accordance with characteristics of the second dense representation. In self-attention, both inputs originate from the same dense representation.

Sum and normalize operation 450B receives (a) contextualized joint representation 456 from self-attention layer 455, and (b) normalized joint representation 451 from sum and normalize operation 450A, sums contextualized joint representation 456 and normalized joint representation 451, and performs a normalization operation such as "layer norm", thus yielding a normalized contextualized joint representation 463, which is routed to classification layer 465.

Classification layer 465 receives normalized contextualized joint representation 463 from sum and normalize operation 450B. Classification layer 465 is a linear classification layer that transforms a dense representation into a discrete probability density distribution with respect to each classification option. This can be done with matrix multiplication followed by a softmax operator. A 1×N embedding associated with a token is multiplied by a N×M classification matrix, which results in M values corresponding to the M possible classification classes or categories. Each of those values is routed in a function, such as a softmax or sigmoid, which normalizes their value between 0 and 1, corresponding to a probability that a token is associated with a class. The class with the highest probability is selected to annotate the token, considering one of the M classes as the "no annotation" class. The output of classification layer 465 is annotated text 225.

Annotated text 225, as mentioned above, is an example of an utterance with annotated intent and concept.

Figure 5:
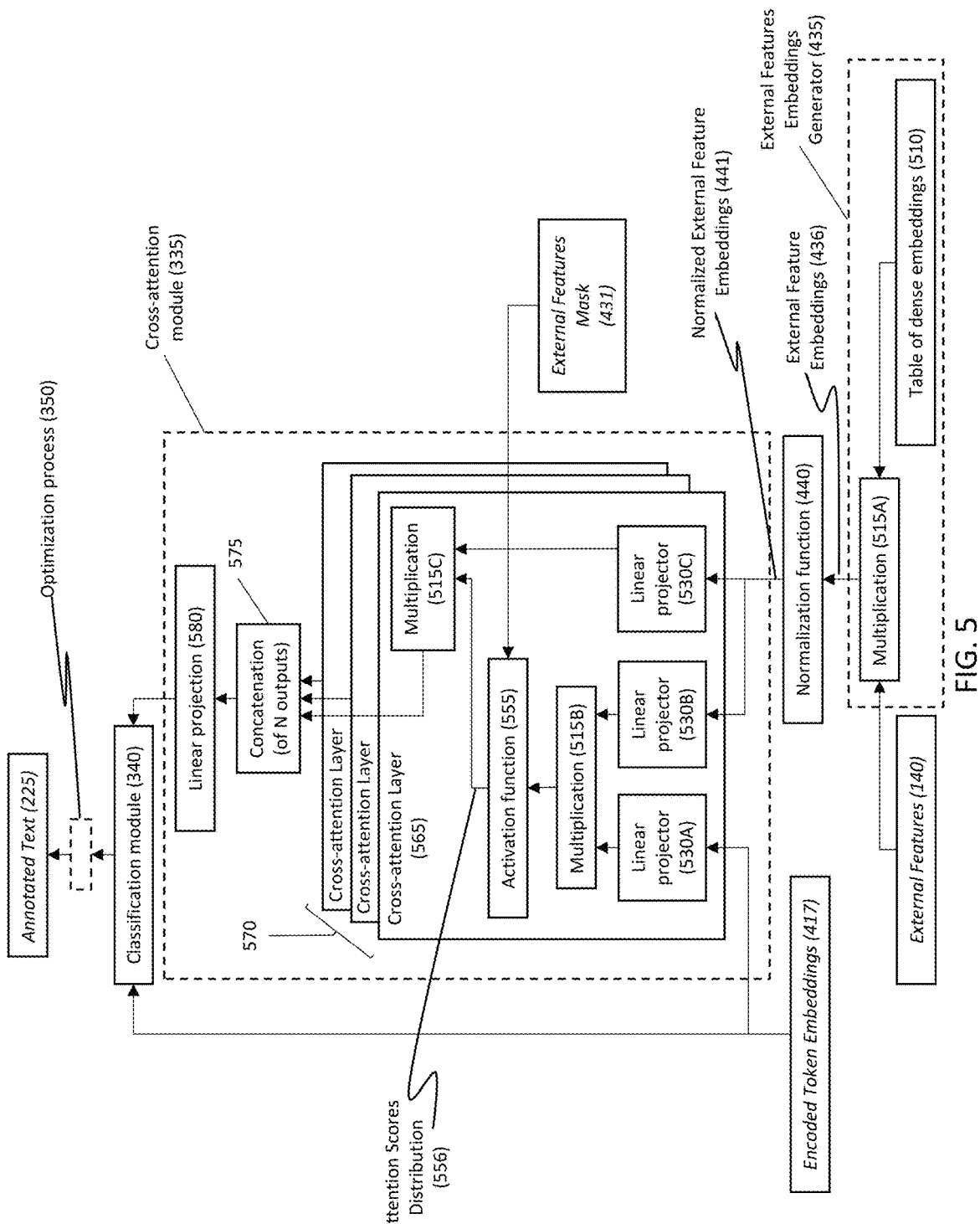
FIG. 5 is a block diagram of a process performed in accordance with a NLU machine learning program.

FIG. 5 is a block diagram of a process 500 performed by NLU machine learning program 155, showing some additional details of cross-attention module 335 and external features embeddings generator 435.

External features embeddings generator 435 includes a multiplication operation 515A and a table of dense embeddings 510.

Cross-attention module 335 includes a linear projection 580, a concatenation 575, and a plurality of cross-attention layers 570, one of which is designated as cross-attention layer 565.

Cross-attention layer 565 includes linear projectors 530A, 530B and 530C, multiplication operations 515B and 515C, and an activation function 555. Each of the plurality of cross-attention layers 570 is configured similarly to cross-attention layer 565, but the weights of the parameters in each layer are optimized from annotated examples and have different values.

Each of multiplication operations 515A, 515B and 515C performs a multiplication between vectors, matrices and/or tensors.

Linear projectors 530A, 530B and 530C are operations that perform multiplication with a matrix and/or tensor.

Encoded token embedding 417 (see FIG. 4) is an output of text encoder 330, and is routed to linear projector 530A and classification module 340. Encoded token embedding 417 is a dense representation of token information, and consists of an array of N floating point values.

Table of dense embeddings 510 is a concatenation of dense vectors, each representing one type of external feature.

Multiplication operation 515A performs a matrix multiplication between external features 140 and table of dense embeddings 510, and produces a product, external features embeddings 436, that is routed to normalization function 440.

Normalization function 440 receives the product, i.e., external features embeddings 436, from multiplication operation 515A, performs a normalizing operation, and provides normalized external feature embeddings 441 to linear projectors 530B and 530C.

Linear projector 530A receives encoded token embeddings 417 and produces a product that is routed to multiplication operation 515B. For example, a vector 1×4N multiplied by a matrix 4N×M produces a 1×M vector that is a linear projection of the 1×4N vector.

Linear projector 530B receives normalized external feature embeddings 441 from normalization function 440, and produces a product in a manner similar to that of linear projector 530A, which is routed to multiplication operation 515B.

Linear projector 530C receives normalized external feature embeddings 441 from normalization function 440, and produces a product in a manner similar to that of linear projector 530A, which is routed to multiplication operation 515C.

Multiplication operation 515B receives products from linear projectors 530A and 530B, and produces a product that is routed to activation function 555.

Activation function 555 receives (a) a product from multiplication operation 515B, and (b) external features mask 431, and calculates an attention scores distribution 556. The attention scores give relative importance to each external feature associated to a token. Activation function 555 can be, for example, a normalized softmax function. Attention scores distribution 556 is provided to multiplication operation 515C.

Multiplication operation 515C receives attention scores distribution 556 from activation function 555, and the product from linear projector 530C, and produces a product that is provided to concatenation 575.

Cross-attention layers 570 are a set of a quantity of N cross-attention layer operations.

Concatenation 575 is a concatenation of the products provided by cross-attention layers 570.

Linear projection 580 receives concatenation 575, and produces a product that is routed to classification module 340.

Classification module 340, as mentioned above, performs a classification operation and produces annotated text 225.

Example of Operation

I. Feature generation, fusion and classification
(a) User 105 communicates an utterance to NLU system 125. The utterance is transformed in the form of text, e.g., with automatic speech recognition, or produced by typing the input text, thus yielding text input 135.
(b) Tokenizer 410 separates the utterance in text input 135 into a sequence of tokens or units, i.e., token units 411.
(c) External features mask generator 430 compares token units 411 to different categories for external features 140, and produces external feature mask 431 to represent the associations between external features and tokens.
(d) External feature encoder 325 encodes external features 140 to produce normalized external feature embeddings 441 representing the external features 140.
(e) Text encoder 330 encodes token units 411 to produce encoded token embeddings 417 representing the text input 135.
(f) Cross-attention module 335 receives normalized external feature embeddings 441, encoded token embeddings 417, and external features mask 431, and produces joint representation 336.
(g) Classification module 340 receives joint representation 336, and produces annotated text 225.

II. Training

Ground truth annotated examples are used to train parameters of model 230. The output of model 230 is a probability for each classification category. Optimization process 350 determines the value of parameters of model 230, optimizing the probabilities of correctly predicting the labels associated to the annotated examples in annotated text 225. The goal of optimization process 350 is to iteratively select values for the parameters in order for model 230 to provide the most accurate predictions. Optimization process 350 is typically performed using gradient descent (or a variant), and the cross-entropy function is typically used to compare the predictions with the ground truth annotations for text classification. Parameters in NLU machine learning program 155 are trained jointly by optimizing the predicted annotations.

III. Inference

In production, text input 135 and external features 140 are passed to model 230, and the output probabilities are used to select which class or category is assigned to the utterance and its tokens. The values of the parameters of model 230 optimized in training are used here and remain unchanged during inference.

IV. Model 230's operations
(a) The token units 411 are represented by their associated dense representation 413.
(b) Dense representations 413 are fed into encoder 416 (e.g., BERT), which generates encoded token embeddings 417.
(c) External features 140 are represented by external feature embeddings 436.
(d) External features mask generator 430 generates external features mask 431, which indicates which external feature is associated to which token in the utterance.
(e) Encoded token embeddings 417 and normalized external feature embeddings 441 are inputted into cross-attention module 335. In cross-attention module 335, cross-attention scores distribution 556 are calculated for each token-external feature pair. External feature mask 431 is used to set to zero, a cross-attention score between any token-external feature pair not represented in the utterance. At the output of cross-attention module 335, an embedding is obtained for each token, i.e. the joint representation 336. This embedding includes both the contextualized token information and the external feature information.
(f) These resulting embeddings are summed and normalized (operation 450A), thus yielding normalized joint representation 451, which is passed to self-attention layer 455.
(g) The output of self-attention layer 455 is summed and normalized (operation 450B), and is projected with classification layer 465 to N values representing the N possible classes, and a softmax function is used to obtain N probability values.
(h) The argmax of the discrete probability function is used to classify the token to a label category.
(i) For sentence-level classification, a generic token is concatenated to the utterance and is used to perform the sentence level classification.

Thus, NLU machine learning program 155:
obtains dense representation 326, i.e., a dense representation of external features 140, (b) dense representation 331, i.e., a dense representation of text input 135, and (c) external features mask 431, which associates external features 140 to token units 411, i.e., tokens of text input 135, and
employs cross-attention module 335, which utilizes external features mask 431 to perform an information fusion of dense representation 326 and dense representation 331, thus yielding joint representation 336, i.e., a joint representation of external features 140 and dense representation 331.

One of the benefits of system 100 is that its utilization of cross-attention module 335 to combine external features and token information provides improved text classification accuracy to model 230.

Although, in FIG. 1, user device 110 and NLU system 125 are communicatively coupled to network 120, system 100 can be configured with model 230 being deployed locally, e.g., on a user's phone.

The techniques described herein are exemplary, and should not be construed as implying any particular limitation on the present disclosure. It should be understood that various alternatives, combinations and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "comprises" or "comprising" are to be interpreted as specifying the presence of the stated features, integers, operations or components, but not precluding the presence of one or more other features, integers, operations or components or groups thereof. The terms "a" and "an" are indefinite articles, and as such, do not preclude embodiments having pluralities of articles.

What is claimed is:

1. A method comprising:
obtaining a dense representation of external features, said dense representation of external features being obtained by multiplying a sparse representation of said external features with a first dense matrix;
obtaining, by a natural language understanding (NLU) application, a dense representation of text, said dense representation of text being obtained by multiplying a sparse representation of said text with a second dense matrix;
obtaining a mask that associates said external features to tokens of said text, the mask being a sparse matrix that represents which external feature is associated with which token of said text;
performing, by a cross-attention process that utilizes said mask, an information fusion of said dense representation of said external features and said tokens of said text;
based on said information fusion, generating, by the NLU application, a joint representation of said external features and said tokens of said text; and
performing, by the NLU application, named entity recognition using the joint representation.

2. The method of claim 1, also comprising:
performing a classification operation that processes said joint representation to produce annotated text.

3. The method of claim 2, wherein said classification operation utilizes a self-attention layer to produce a contextual joint representation of said joint representation.

4. The method of claim 3, wherein said classification operation:
normalizes said contextual joint representation to generate a normalized contextual joint representation,
employs a classification layer that transforms said normalized contextual joint representation into a discrete probability density distribution, and
utilizes said discrete probability density distribution to produce said annotated text.

5. The method of claim 1, also comprising:
calculating cross-attention scores for each pair of said tokens and said external features; and
setting, using the mask, a cross-attention score to zero between a token-external feature pair not represented in said text.

6. The method of claim 1, also comprising comparing token units of text to different categories of external features to generate said mask.

7. The method of claim 1, also comprising:
prior to performing said information fusion, employing a normalization function on said dense representation of said external features to generate normalized data,
wherein said cross-attention process performs said information fusion on said normalized data.

8. The method of claim 1, also comprising:
performing a sum and normalize operation of said joint representation and said tokens of text to generate a normalized joint representation.

9. A system comprising:
a processor; and
a memory that contains instructions that are readable by said processor to cause said processor to perform operations of:
obtaining a dense representation of external features, said dense representation of external features being obtained by multiplying a sparse representation of said external features with a first dense matrix;
obtaining, by a natural language understanding (NLU) application, a dense representation of text, said dense representation of text being obtained by multiplying a sparse representation of said text with a second dense matrix;
obtaining a mask that associates said external features to tokens of said text, the mask being a sparse matrix that represents which external feature is associated with which token of said text;
performing, by a cross-attention process that utilizes said mask, an information fusion of said dense representation of said external features and said tokens of said text;
based on said information fusion, generating, by the NLU application, a joint representation of said external features and said tokens of said text; and
performing, by the NLU application, named entity recognition using the joint representation.

10. The system of claim 9, wherein said operations also include:
performing a classification operation that processes said joint representation to produce annotated text.

11. The system of claim 10, wherein said classification operation utilizes a self-attention layer to produce a contextual joint representation of said joint representation.

12. The system of claim 11, wherein said classification operation:
normalizes said contextual joint representation to generate a normalized contextual joint representation,
employs a classification layer that transforms said normalized contextual joint representation into a discrete probability density distribution, and
utilizes said discrete probability density distribution to produce said annotated text.

13. The system of claim 9, wherein said operations also include employing an external features embedding generator to transform external features into said dense representation of external features.

14. The system of claim 9, wherein said operations also include comparing token units of text to different categories of external features to generate said mask.

15. The system of claim 9, wherein said operations also include:
prior to performing said information fusion, employing a normalization function on said dense representation of said external features to generate normalized data,
wherein said cross-attention process performs said information fusion on said normalized data.

16. The system of claim 9, wherein said operations also include:
receiving, by the NLU application, an utterance from a user; and
transforming the utterance into said text.

17. A storage device that is non-transitory, comprising instructions that are readable by a processor to cause said processor to perform operations of:
obtaining a dense representation of external features, said dense representation of external features being obtained by multiplying a sparse representation of said external features with a first dense matrix;
obtaining, by a natural language understanding (NLU) application, a dense representation of text, said dense representation of text being obtained by multiplying a sparse representation of said text with a second dense matrix;

obtaining a mask that associates said external features to tokens of said text, the mask being a sparse matrix that represents which external feature is associated with which token of said text;

performing, by a cross-attention process that utilizes said mask, an information fusion of said dense representation of said external features and said tokens of said text;

based on said information fusion, generating, by the NLU application, a joint representation of said external features and said tokens of said text; and performing, by the NLU application, named entity recognition using the joint representation.

18. The storage device of claim 17, wherein said operations also include:

performing a classification operation that processes said joint representation to produce annotated text.

19. The storage device of claim 18, wherein said classification operation utilizes a self-attention layer to produce a contextual joint representation of said joint representation.

20. The storage device of claim 19, wherein said classification operation:

normalizes said contextual joint representation to generate a normalized contextual joint representation, employs a classification layer that transforms said normalized contextual joint representation into a discrete probability density distribution, and utilizes said discrete probability density distribution to produce said annotated text.

* * * * *